Oct. 15, 1946.  A. E. BARILI  2,409,239
BOMB SIGHT AND BOMB-RELEASING DEVICE
Filed May 22, 1942  2 Sheets-Sheet 1
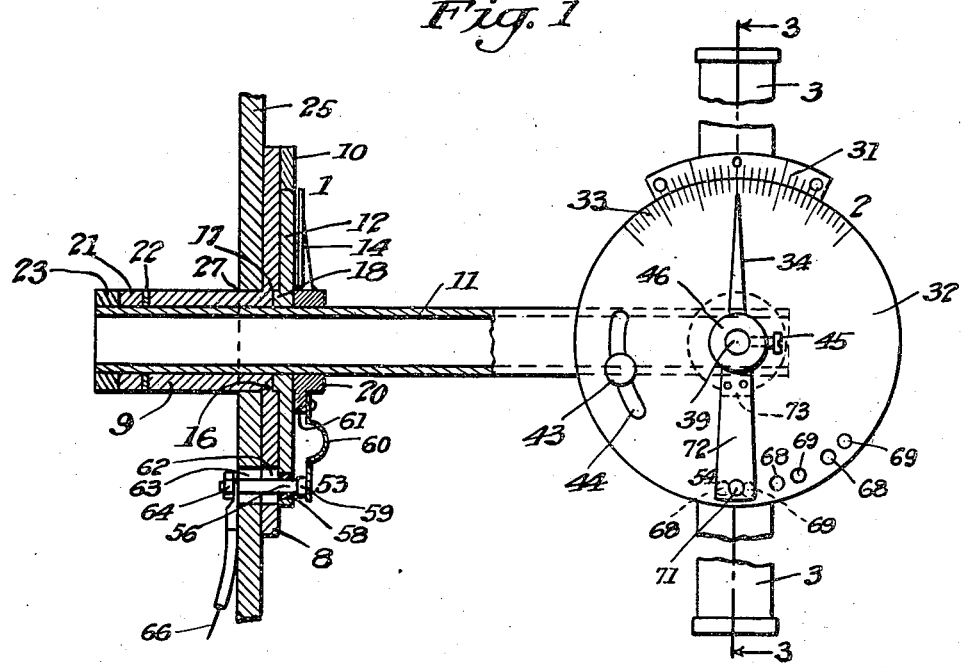
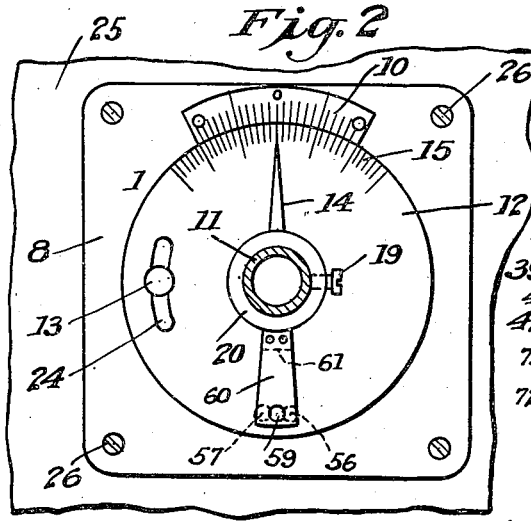
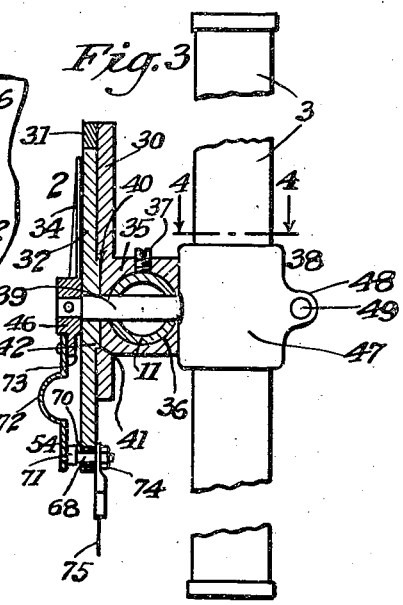
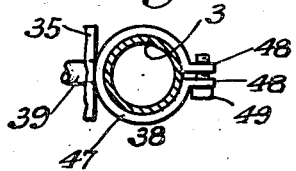
INVENTOR.
Arthur E. Barili,
BY Alan Franklin,
ATTORNEY.

Oct. 15, 1946.  A. E. BARILI  2,409,239
BOMB SIGHT AND BOMB-RELEASING DEVICE
Filed May 22, 1942  2 Sheets-Sheet 2
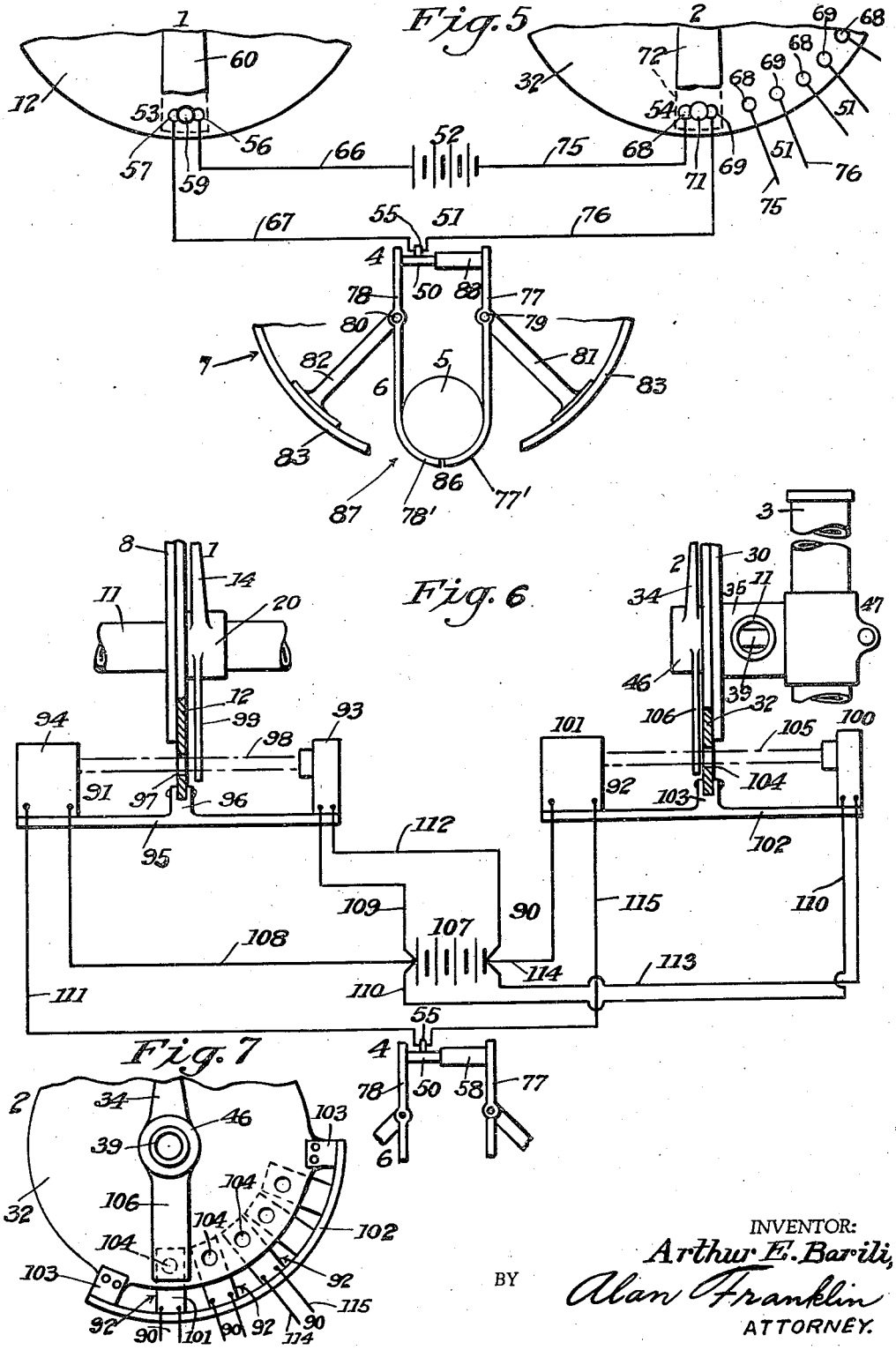
INVENTOR:
Arthur E. Barili,
BY Alan Franklin
ATTORNEY.

Patented Oct. 15, 1946

2,409,239

UNITED STATES PATENT OFFICE 2,409,239

BOMB SIGHT AND BOMB-RELEASING DEVICE

Arthur E. Barili, Los Angeles, Calif.

Application May 22, 1942, Serial No. 444,047

6 Claims. (Cl. 89—1.5)

This invention relates to bomb sights and bomb-releasing devices for bombing airplanes, and the general object of the invention is to provide an improved bomb sight and bomb-releasing device, by means of which an object to be bombed may be sighted and a bomb automatically and instantly released and dropped from a bombing plane with great accuracy upon said object, when the plane is brought by its pilot into its exact position for bombing said object.

A more particular object is to provide a bomb sight and bomb-releasing device of the character stated which is actuated by an "electric eye."

Other objects and advantages will appear hereinafter. The invention is illustrated in the annexed drawings, which form a part of this specification and in which:

Fig. 1 is a view partly in longitudinal section and partly in side elevation of my invention.

Fig. 2 is a front view of the ground-track indicator of my invention.

Fig. 3 is a vertical longitudinal section of the trajectory indicator of my invention taken on line 3—3 of Fig. 1.

Fig. 4 is a cross section of the sight taken on line 4—4 of Fig. 1.

Fig. 5 is a diagram of one bomb-releasing circuit.

Fig. 6 is a diagram of another bomb-releasing circuit, actuated by electric eyes.

Fig. 7 is a face view of a bomb-trajectory indicator used in the circuit shown in Fig. 6.

Referring more particularly to the drawings, in which corresponding parts are designated by the same reference numerals in all of the figures, my bomb sight includes generally a ground-track indicator 1, a bomb-trajectory indicator 2, a tubular sight 3, and means 4 for automatically releasing a bomb 5 from a bomb rack 6 mounted in a suitable part of an airplane 7.

The ground-track indicator 1 includes a base plate 8 formed with a bearing 9; a side drift correction scale 10 located on the face of said plate near the upper edge thereof; a tubular shaft 11 with its forward end portion journaled in said bearing 9; a disc dial 12 turnably mounted on said base plate against the face thereof, and turnably fitted on said tubular shaft; a thumb screw 13 for adjustably securing said dial on said plate 8; and a pointer 14 secured on said tubular shaft 11 for pointing to a ground-track scale 15 on the upper edge portion of said dial 12 opposite said side drift correction scale 10. The dial 12 is turnably mounted on the plate 8 by means of a precision bearing 16, formed by a recess bearing 17 in the face of said plate and a journal 18 on the adjacent side of said dial, which journal is fitted in said recess bearing. The pointer 14 is secured on the tubular shaft 11 adjacent the face of the dial 12 by set screw 19 threaded in the hub 20 of said pointer and engaging said tubular shaft, which hub is fitted on said shaft. A nut 21 is threaded on the forward end portion of the tubular shaft 11, and a washer 22 is fitted on said end portion of said shaft between said nut and the forward end of the plate bearing 9, whereby said tubular shaft 11, pointer 14 and dial 12 are adjustably held in position, with the pointer hub 20 engaging the face of the dial 12 and holding the dial journal 18 in the recess bearing 17 in the plate 1. A lock nut 23 is also threaded on the forward end portion of the tubular shaft 11 forwardly of nut 21, for engaging and locking said nut 21 in position on said tubular shaft.

The thumb screw 13 extends through a concentric slot 24 in the dial 12 and is threaded in the plate 8, so that the head of said thumb screw may be tightened against said dial for securing said dial in adjusted positions to which it may be turned on its axis. The ground track indicator 1 is mounted on the instrument panel 25 of an airplane by screws 26, driven through the base plate 8, at the corners thereof, respectively, into said panel, which plate is thereby secured on said panel with its bearing 9 extending forwardly therefrom through an opening 27 in said panel.

The bomb-trajectory indicator 2 includes an arcuate base plate 30 with a bomb-trajectory correction scale 31 on its face at its upper edge; a disc dial 32 with a bomb-trajectory scale 33 on its face at its upper edge; and a pointer 34 which points to said bomb-trajectory scale. The base plate 30 is formed with a rearwardly extending hub 35 provided with a diametrical bore 36 which receives the rear end of the tubular shaft 11, and a set screw 37 is threaded in said hub in engagement with said shaft 11, whereby the bomb-trajectory indicator 2 is secured on the rear end of said tubular shaft. From one side of a sight clamp 38, in which the tubular sight 3 is clamped, projects a stud shaft 39, which extends axially through the base plate hub 35 and diametrically through the tubular shaft 11, and through the base plate 30, and said stud shaft is journaled in said hub, forming a pivot on which said sight clamp 38 tubular sight 3 may be turned to direct the sight upon an object to be bombed. The dial 32 is turnably fitted on the outer end portion of said stud shaft 39 and is turnably mounted on the face of the base plate 30 by means of a precision bearing 40 formed by a recess bearing 41 in the face of said base plate, and a journal 42 on the rear of said dial, which journal is fitted in said recess bearing.

The dial 32 is adjustably secured against turning by a thumb screw 43, which extends through a concentric arcuate slot 44 in said dial and is threaded in the base plate 30, so that the head of said thumb screw may be tightened against said dial upon turning the thumb screw. The pointer 34 is secured on the outer end of the stud shaft 39 by means of a set screw 45 threaded in the pointer hub 46 and engaging said stud shaft, on which stud shaft said hub is fitted, with the inner end of said hub adjacent the face of the dial 32, and the side of the clamp 38, from which the stud shaft 39 extends, adjacent the end of the hub 35 of the base plate 30, whereby the parts of the trajectory indicator 2 and the sight clamp 38 are held together in assembled relation, with the tubular sight 3 clamped in operative position in said sight clamp. Said sight clamp 38 is in the form of a split sleeve 47, from one side of which projects the stud shaft 39, while its opposite side is split longitudinally, there being a pair of ears 48 outstanding from the split side of said sleeve at the edges, respectively, of the split in the sleeve, and a thumb screw 49 is extended through one of said ears with its head engaging said ear, and the screw threaded in said other ear, whereby the clamp sleeve 47 is clamped around the tubular sight 3.

The automatic bomb-releasing means 4 may comprise a cartridge 50 operatively mounted in the bomb rack 6, and an electric cartridge firing circuit 51 which is automatically closed, in the manner hereinafter described, by the ground-track indicator and the trajectory indicator 2, when said indicators indicate the bombing position of a plane on which my invention is mounted. Said cartridge firing circuit 51 includes a generator 52, a ground-track indicator switch 53, a bomb-trajectory indicator switch 54, and a firing plug 55 extending into said cartridge. Said ground-track indicator switch 53 comprises a pair of stud terminal contacts 56 and 57 secured at one end in the lower part of the dial 12, in insulation bushings 58 and a movable contact 59 secured on the lower end of a spring arm 60 which is riveted at its upper end to a flange 61 depending from the hub 20 of the pointer 14. The stud terminal contacts 56 and 57 extend from the face of the dial 12 forwardly through said dial and their bushings 58 and through openings 62 and 63 in the plate 8 and instrument panel 25, respectively, and clamp nuts 64 are threaded on the reduced forward ends of said stud terminal contacts for electrically connecting wires 66 and 67 of the cartridge firing circuit 51 to said contacts 56 and 57, respectively. Said trajectory indicator switch 54 comprises a pair of stud terminal contacts 68 and 69, secured in the lower part of the dial 32 in insulation bushings 70, and a movable contact 71 secured on the lower end of a spring arm 72, which is riveted at its upper end to a flange 73 depending from the hub 46 of the pointer 34. The stud terminal contacts 68 and 69 extend from the face of the dial 32 rearwardly through said dial and their insulation bushings 70, and clamp nuts 74 are threaded on the rear ends of said contacts for electrically connecting wires 75 and 76 of the cartridge firing circuit 51, to said contacts, respectively, between said nuts and the bushings 70. The wire 66 of the cartridge firing circuit 51 leads from one pole of the generator 52 to the terminal contact 56 of switch 53, while the wire 67 leads from the switch contact 57 to one terminal of the cartridge ignition plug 55. The wire 75 of the circuit 51 leads from the other pole of the generator 52 to the terminal contact 68 of switch 54, while the wire 76 leads from the switch contact 69 to the other terminal of the cartridge ignition plug 55.

The bomb rack 6 may be of any suitable form, such as illustrated in Fig. 5 of the drawings, in which the rack comprises a pair of vertically disposed levers 77 and 78, pivoted at 79 and 80, respectively, to brackets 81 and 82, respectively, secured to the body 83 of an airplane 7 equipped with my invention, the lower end portions 77' and 78' of said levers, respectively, being curved inwardly toward each other and forming a seat 86 upon which the bomb 5 rests and is supported until it is dropped through an opening 87 below in the bottom of said fuselage, upon swinging said levers 77 and 78 on their pivots until their lower ends are spread apart sufficiently to allow the bomb to drop therebetween. A cartridge holder 88 is secured on the inner side of the rack lever 77 at the upper end of said lever for receiving one end of a cartridge 50 and holding said cartridge with its other end engaging the inner side of the rack lever 78 near the upper end of said lever, whereby the rack levers 77 and 78 are held cocked with their upper ends spaced apart and their lower curved ends held together, forming the seat 86 supporting the bomb 5.

My invention contemplates more than one bomb rack 6 and automatic bomb releasing means 4 for dropping more than one bomb 5, and accordingly additional pairs of switch contacts 68 and 69 are mounted progressively in the dial 32 of the bomb-trajectory indicator 2 at the right of the first described contacts 68 and 69 of the switch 54 of said indicator, which additional switch contacts may be connected to the leads 75 and 76 of the cartridge explosion circuits 51, respectively, of such additional automatic bomb releasing means (not shown).

The operation of my invention is as follows:

The ground-track indicator 1 is adjusted to indicate the side drift of the airplane, as determined by a calculating machine (not shown), upon turning the dial 12 to the right or to the left, until its scale 15 registers properly with the correction scale 10, and said dial is then secured in such adjusted position by tightening the thumb screw 13 against said dial. The bomb-trajectory indicator 2 is adjusted to indicate the trajectory of the bomb 5 from a predetermined altitude at a predetermined speed of the plane, as determined by said calculating machine, upon turning the dial 32 to the right or to the left until its scale 33 registers properly with the correction scale 31, and said dial is then secured in its adjusted position by tightening the thumb screw 43 against said dial. The bombardier, looking through the tubular sight 3, directs said sight upon the object to be bombed, and in doing so turns the tubular shaft 11, in its bearing 9, and the pointer 14 over the dial 12 with relation to the dial scale 15 of the ground-track indicator 1 and turns the stud shaft 39, in its bearing in the hub 35, and the pointer 34 over the face of the dial 32 with relation to the dial scale 33, whereby the ground-track indicator 1 indicates the position of the plane off its ground-track course toward the object to be bombed, and the bomb-trajectory indicator 2 indicates the position of the plane at the rear of its bombing position for said object. The pilot, being notified by the bombardier that the sight is directed upon the target and reading said indicators 1 and 2, directs the plane along its ground track toward its bombing position, and when said position is reached the pointer 14 points to zero on the scale 15 of the ground track indicator 1 and the contact 59 of the switch 53 of said indicator engages the contacts 56 and 57 of said switch and closes said switch, while the pointer 34 points to zero on the scale 33 of the bomb-trajectory indicator 2 and the contact 71 of the switch 54 of said indicator engages the contacts 68 and 69 of said switch and closes said switch and the cartridge firing circuit 51, whereupon the cartridge 50 in said circuit is fired and exploded and the weight of the bomb 5 spreads apart the lower ends of the rack levers 77 and 78, which swing on their pivots, and the bomb 5 drops between the lower ends of said levers through the opening 87 in the bottom of the plane onto the object to be bombed.

Immediately after said automatic bomb releasing means 4 is actuated and said bomb 5 is dropped as above described, the bombardier may swing the tubular sight 3 and swing the arm 72 of the trajectory-indicator switch 54, so that the contact 71 on said arm will progressively engage the respective pairs of contacts 68 and 69 at the right of said first pair of contacts 68 and 69, to close additional cartridge explosion circuits 51, respectively, to actuate additional automatic bomb releasing means 4, respectively, to drop additional bombs 5.

In Fig. 6 of the drawings is illustrated a bomb-releasing circuit 90, in which an electric eye 91 is substituted for the ground track switch 53, and an electric eye 92 is substituted for the bomb-trajectory switch 54 of the cartridge firing circuit 51. The electric eye 91 comprises a light source 93 and a photoelectric relay 94 mounted on a supporting plate 95 suspended by an arm 96 from the dial 12 of the ground-track indicator 1, said dial being provided with an opening 97 through which the light source 93 projects its light beam 98 onto said photoelectric relay 94, and there being a shutter 99 depending from the hub 20 of the pointer 14 of said ground-track indicator 1, which shutter covers said light opening 97 when said pointer 14 points to zero on the dial ground-track scale 15. The electric eye 92 comprises a light source 100 and a photoelectric relay 101 mounted on a supporting plate 102 suspended by arms 103 from the dial 32 of the bomb-trajectory indicator 2, said dial being provided with an opening 104 through which the light source 100 projects its light beam 105 onto the photoelectric relay 101, and there being a shutter 106 depending from the hub 46 of the pointer 34 of said bomb-trajectory indicator 2, which shutter covers said light opening 104 when said pointer 34 points to zero on the bomb-trajectory scale 33 on said dial 32. As shown in Fig. 7 a plurality of light openings 104 may be located in the dial 32 and a plurality of electric eyes 92 controlling a plurality of circuits 90, respectively, may be mounted on the plate 102 for projecting their beams 105, respectively, through said light openings 104, until said beams are interrupted successively by the shutter 106 when swung over said openings. The circuit 90 is energized by a battery 107. From one pole of said battery extend leads 108, 109 and 110; the lead 108 extending to one terminal of the photoelectric relay 94 of the electric eye 91; the lead 109 extending to one terminal of the light source 93 of said electric eye; and the lead 110 extending to one terminal of the light source 100. From the other terminal of said photoelectric relay 94 a lead 111 extends to one terminal of the spark plug 55 of the cartridge 50, which holds the bomb rack 6 in position holding the bomb 5 as hereinbefore described. From the other terminal of said light source 93 extends a lead 112 to the other pole of said battery 107. From said other pole of said battery also extend leads 113 and 114, the lead 113 extending to the other terminal of the light source 100, and the lead 114 extending to one terminal of the photoelectric relay 101 of the electric eye 92, and from the other terminal of said photoelectric relay extends a lead 115 to the other terminal of the spark plug 55 of the cartridge 50.

The operation of the bomb-releasing circuit 90 is as follows:

The light beam 98 of electric eye 91 is produced by electric current passing from battery 107 through lead 109, light source 93 and lead 112 back to said battery, while the light beam 105 of electric eye 92 is produced by electric current passing from battery 107 through lead 110, light source 100 and lead 113 back to said battery.

When the pointers 14 and 34 of the ground-track indicator 1 and the bomb-trajectory indicator 2, respectively, point to graduations at either side of zero on the scales 15 and 33, of said indicators, respectively, the shutters 99 and 106 uncover the light openings 97 and 104 in the dials 12 and 32 of said indicators, respectively, and the light source 93 of the electric eye 91 projects its beam of light 98 through said light opening 97 onto the photoelectric relay 94, while the light source 100 of the electric eye 92 projects its beam 105 through said light opening 104 in dial 32 onto the photoelectric relay 101, so that each of said relays breaks the bomb-releasing circuit 90 and prevent explosion of the cartridge 50. If only the light beam 98 of electric eye 91 should be interrupted by shutter 99, upon the pointer 14 pointing to zero on the scale 15 of ground track indicator 1, the bomb-releasing circuit 90 would be only partly closed by the relay 94, because the relay 101, with the light beam 105 still projecting thereupon, would still maintain said circuit 90 open, and the cartridge 50 would not be exploded. If only the light beam 105 should be interrupted by the shutter 106, upon the pointer 34 pointing to zero on the scale 33 of the bomb-trajectory indicator 2, the bomb-releasing circuit 90 would be only partly closed by the relay 101, because the relay 94, with the light beam 98 still projecting thereupon, would still maintain said circuit 90 open, and the cartridge 50 would not be exploded.

When the bombing plane is brought to its bombing position, the ground-track indicator 1 indicates zero by its pointer 14 pointing to its scale 15, and its shutter 99 covers the light opening 97 in dial 12 and interrupts the light beam 98 of electric eye 91, whereupon the photoelectric relay 94 partly closes the bomb-releasing circuit 90, while the bomb-trajectory indicator 2 also indicates zero by its pointer 34 pointing to zero on its scale 33, and its shutter 106 covers the light opening 104 in dial 32 and interrupts the light beam 105 of electric eye 92, whereupon the photoelectric relay 101 completely closes the bomb-releasing circuit 90, and electric current passes from battery 107 through lead 108, photoelectric relay 94, lead 111, spark plug 55 of cartridge 50, lead 115, photoelectric relay 101 and lead 114 back to battery, whereupon said cartridge is exploded, and the bomb rack 6 releases the bomb 5 which is dropped upon the target as hereinbefore described.

When the pointer 34 points to zero and the shutter 106 covers the first opening 104, as shown in Fig. 7, and interrupts the light beam 105 of the first electric eye 92 and closes the first circuit 90 and releases the first bomb 5 from its rack 6, the bombardier may swing the sight 3 to cause the shutter 106 to be swung to cover the remaining light openings 104 successively, to interrupt the light beams 105 of the remaining electric eyes 92, successively, and release the remaining bombs 5 from their racks 6, successively, thus releasing a plurality of bombs in rapid succession when the plane reaches its exact bombing position.

I claim:

1. A bomb sight as disclosed, comprising a sight, a ground track indicator actuated by said sight for indicating the position of the plane with relation to its ground track leading to a target, a bomb-trajectory indicator actuated by said sight for indicating the position of the plane with relation to its bomb releasing position, a bomb-releasing circuit including two switches, and means actuated by said indicators, respectively, for closing said switches when both of said indicators indicate zero.

2. A bomb sight as disclosed, including ground track indicator comprising a ground-track dial with a ground-track scale thereon, and a ground-track pointer for pointing to said ground-track scale to indicate the position of the plane with relation to its ground track leading to a target; a bomb-trajectory indicator comprising a bomb-trajectory dial with a bomb-trajectory scale thereon, and a bomb-trajectory pointer for pointing to said bomb-trajectory scale to indicate the position of the plane with relation to its bomb-releasing position; a sight turnably mounted on two horizontal axes to be turned endwise either transversely or longitudinally of the plane or both transversely and longitudinally at the same time; means whereby said ground-track pointer is turned with relation to said ground-track scale when said sight is turned endwise transversely of the plane and whereby said bomb trajectory pointer is turned with relation to said bomb-trajectory scale, when said sight is turned endwise longitudinally of the plane, to direct said sight upon a target; and means for automatically releasing a bomb from the plane when the plane reaches its bomb-releasing position and said ground-track pointer points to zero on said ground-track scale, and said bomb-trajectory pointer points to zero on said bomb-trajectory scale.

3. A bomb sight as disclosed, including a ground-track indicator comprising a turnable ground-track dial with a ground track scale thereon, a ground-track correction scale with which said ground-track dial scale may be read and with relation to which said ground-track scale may be adjusted upon turning said dial, and a pointer for pointing to said ground track scale to indicate the position of the plane with relation to its ground track leading to a target; a bomb-trajectory indicator comprising a turnable bomb-trajectory dial with a bomb trajectory scale thereon, a bomb-trajectory correction scale with which said bomb-trajectory dial scale may be read and with relation to which said bomb-trajectory dial scale may be adjusted upon turning said dial, and a pointer for pointing to said bomb-trajectory scale to indicate the position of the plane with relation to its bomb-releasing position; a sight mounted to be turned endwise transversely and longitudinally of the plane, means whereby said ground-track indicator pointer is turned with relation to said ground-track dial scale, when said sight is turned endwise transversely of the plane, and whereby said bomb-trajectory indicator pointer is turned with relation to said bomb-trajectory dial scale, when said sight is turned longitudinally of the plane, to direct said sight upon the target.

4. A bomb sight and bomb-releasing device including a sight, a ground-track indicator, a bomb-trajectory indicator, a bomb rack, and a releasing circuit for actuating said bomb rack to release a bomb therefrom, said ground-track indicator comprising a dial with a ground-track scale thereon, a turnably-mounted shaft, and a pointer secured on said shaft and pointing to said ground-track scale, said bomb-trajectory indicator comprising a dial with a bomb-trajectory scale thereon, which dial is secured on said shaft, a second turnably-mounted shaft extending transversely through said first shaft, on which second shaft said sight is secured to be turned endwise as said second shaft is turned in its bearing, and a pointer secured on said second shaft and pointing to said bomb-trajectory scale, and said releasing circuit including two controlling switches constructed and arranged to be closed by said pointers of said ground-track indicator and said bomb-trajectory indicator, respectively, when said pointers point to zero on said ground-track scale and said bomb-trajectory scale at the same time.

5. A bomb sight and bomb-releasing device including a sight, a ground-track indicator, a bomb-trajectory indicator, a bomb rack, and a releasing circuit for actuating said bomb rack to release a bomb therefrom, means for mounting said sight for actuating said indicators, respectively, when said sight is turned endwise in different planes, respectively, and said releasing circuit including two controlling switches constructed and arranged to be closed by said indicators, respectively, when said indicators indicate zero at the same time.

6. A bomb sight as disclosed comprising a sight, a ground-track indicator actuated by said sight for indicating the position of the plane with relation to its ground track leading to a target, a bomb-trajectory indicator actuated by said sight for indicating the position of the plane with relation to its bomb-releasing position, bomb-holding means, an electrical releasing circuit for said bomb-holding means including two electric eyes, and means for interrupting the light beams of both of said electric eyes for closing said bomb-releasing circuit, when the plane reaches its bombing position and both said ground-track indicator and said bomb-trajectory indicate zero.

ARTHUR E. BARILI.